July 19, 1966  R. GILMONT  3,261,207
CARTESIAN DIVER TYPE DEVICE
Original Filed Jan. 31, 1962  2 Sheets-Sheet 1
FIG.1  FIG.2  FIG.3
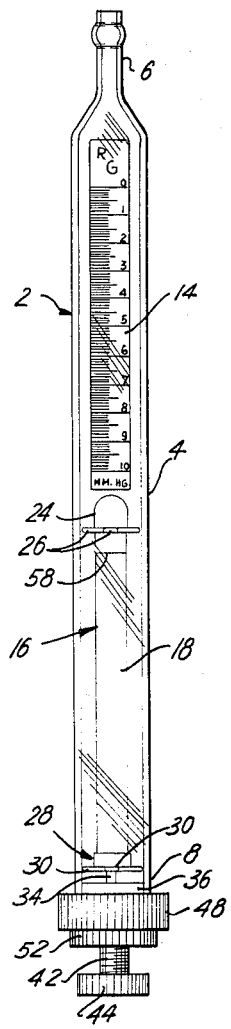
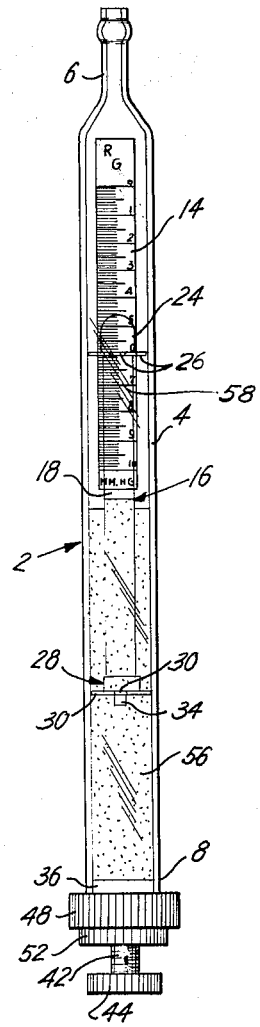
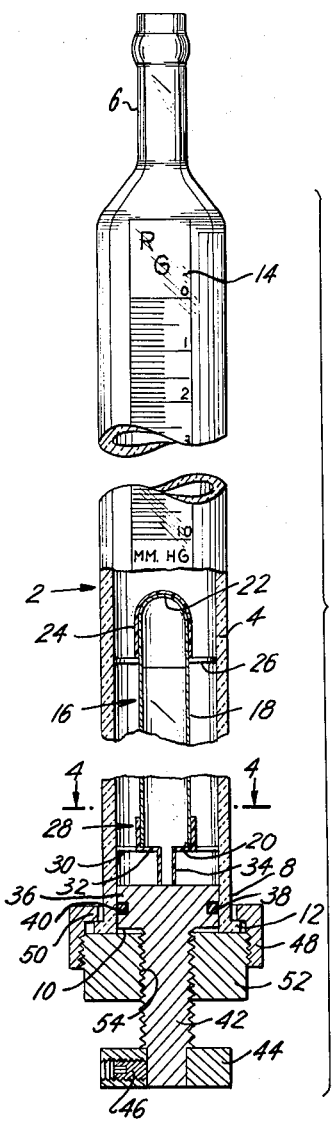
FIG.4
INVENTOR.
ROGER GILMONT
BY James and Franklin
ATTORNEYS

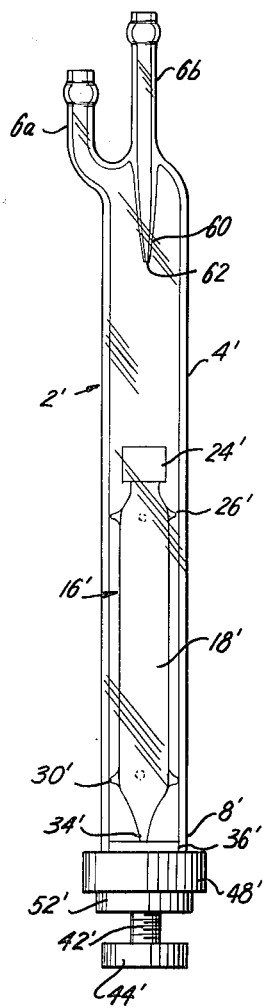
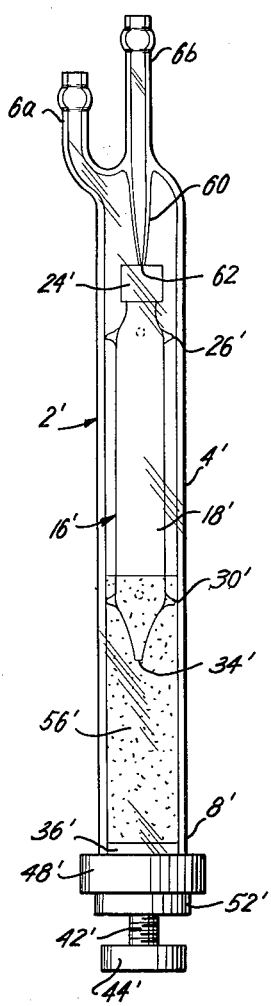
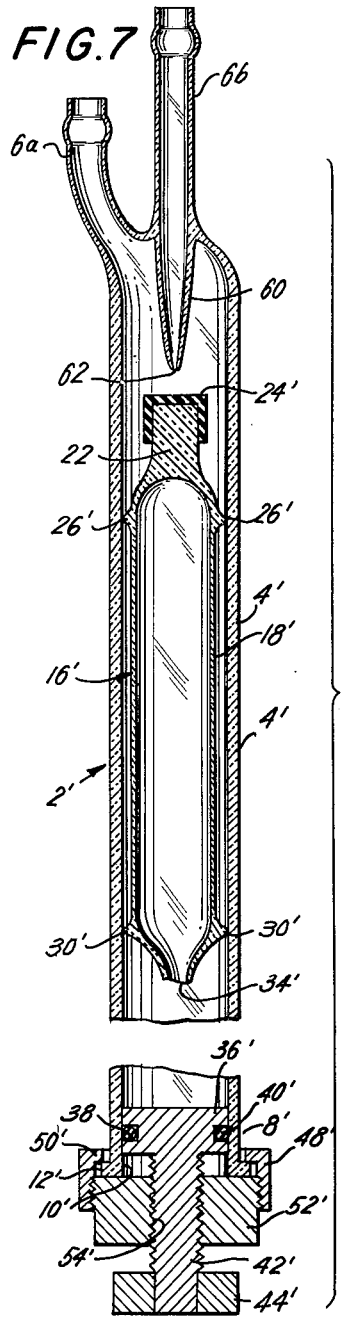
INVENTOR.
ROGER GILMONT

United States Patent Office 3,261,207
Patented July 19, 1966

3,261,207
CARTESIAN DIVER TYPE DEVICE
Roger Gilmont, Douglaston, N.Y., assignor to Roger Gilmont Instruments, Inc., Great Neck, N.Y., a corporation of New York
Continuation of application Ser. No. 170,206, Jan. 31, 1962. This application June 22, 1965, Ser. No. 468,671
3 Claims. (Cl. 73—403)

The present invention relates to improvements in cartesian diver type devices, and in particular to improvements facilitating the adjustable setting of such devices, protecting the devices from sudden changes in pressure, and facilitating the manufacture thereof.

This application is a continuation of application Serial No. 170,206 filed January 31, 1962, now abandoned.

The cartesian diver principle has long been used in the design of devices for sensing pressure. In some instances the devices are in the nature of gages, which measure and indicate the sensed pressure, and in other instances the devices are in the nature of manostats, which sense pressure and carry out a control function, such as the opening and closing of a valve, in accordance therewith. The best known and most widely used prior constructions or devices of this nature are described and analyzed in my papers entitled "Theory and Operation of a Cartesian Diver Type of Manostat" (Analytical Edition, Industrial and Engineering Chemistry, vol. 18, page 633, October 15, 1946) and "Design and Operational Characteristics of Cartesian Manostats" (Analytical Chemistry, vol. 23, page 157, of January 1951).

In devices of the type under discussion a float element is floatingly suspended in a bath of liquid such as mercury, part of the float being supported in that liquid and part of the float extending up into a chamber which is subjected to the pressure to be sensed. The float contains a trapped volume of gas at predetermined pressure. The position of the float relative to the liquid in which it is supported will vary as the pressure in the chamber varies. Thus the position of the float can be used to provide a visual indication of the pressure in the chamber, the device thus functioning as a gage, or the position of the float may be caused to actuate a valve in accordance with the sensed pressure, thereby functioning as a manostat. In either case some means of manually adjusting the position of the float when subjected to a given pressure is highly desirable. When the device is functioning as a gage such adjustment is useful for zero setting. When the device is functioning as a manostat such adjustment is useful in order to be able to control the magnitude of the sensed pressure which is effective to cause actuation of the controlled valve or other device.

In the past this type of control has been accomplished by providing a central tube which extends up into the float and over which the float telescopes, and using that tube to vary the pressure of the gas trapped in the float. This makes for complexity and expense and reduces the sensitivity of the device. With the construction of the present invention, however, manual adjustability of the float position for a given pressure is readily accomplished without having to use a central tube and by means of structure which permits manufacture of the device exceedingly inexpensively, but with an improvement in reliability and accuracy. More specifically, this result is achieved by forming the float housing so that the portion thereof in which the float-suspending liquid is adapted to be received is provided with a movable wall part, here shown as a piston sealingly slidable within a tubular portion of the housing. Means accessible from the exterior of the housing are operatively connected to that wall part so that its position relative to the housing proper may be manually adjusted. Thus, the upper level of the liquid in the housing may be brought to a desired position, and the float which is suspended in the liquid will be positioned accordingly.

With devices of the prior art, and particularly those where central tubes were provided for purposes of adjustment, the lower ends of the floats had large openings. As a result, if there was a sudden drop in the pressure being sensed, the float would fall rapidly within its chamber and would hit the bottom of the housing with appreciable force. Since the float is made as light as possible in order to maximize sensitivity, it is fragile, and the force involved in its rapid drop and sudden stop, when the sensed pressure falls rapidly, often causes it to break. In accordance with the present invention, however, the lower end of the float may be provided with a narrow opening the cross-sectional area of which is but a minor fraction of the internal cross-sectional area of the float proper. As a result rapid changes in the pressure being sensed are transmitted to the interior of the float in a delayed manner, the narrow orifice at the bottom of the float performing a throttling action. Hence the float will move down slowly even though the pressure being sensed may be reduced rapidly, and the breakage of the float is substantially minimized.

Additional features of construction embodied in the devices here disclosed facilitate manufacture by permitting the use of more or less standard components, readily commercially available. In this regard particular mention may be made of the fact that the housing may be formed, apart from its pressure orifices, of standard tubular glass or other material, and that the float may also be formed of standard thin-walled tubes to which inexpensive molded plastic caps may be applied to provide for proper bearing action and to produce the narrow bottom opening which provides a safety factor, as explained above. In addition, the caps provide a definite cushioning effect for the fragile float.

While the instant invention is here specifically disclosed and described in two embodiments, one functioning as a gage and the other as a monostat or pressure control, it will be understood that these two embodiments are chosen for illustrative purposes only, and that the applicability of the improvements here disclosed is not limited to those two specific embodiments.

To the accomplishment of the above, and to such other objects as may hereinafter appear, the present invention relates to the construction of a cartesian diver type pressure sensitive instrument, as defined in the appended claims, and as described in this specification, taken together with the accompany drawings in which:

FIG. 1 is a side elevational view of a gage-type device made in accordance with the present invention, but with no float-supporting liquid therein;

FIG. 2 is a view similar to FIG. 1, but with the float-supporting liquid therein;

FIG. 3 is a side elevational view on an enlarged scale, partially broken away and cross-sectioned, of the device of FIG. 1;

FIG. 4 is a cross-sectional view taken along the line 4—4 of FIG. 3;

FIG. 5 is a side elevational view of a manostat embodiment of the present invention, shown without any float-supporting liquid;

FIG. 6 is a view similar to FIG. 5 but with the float-supporting liquid therein; and FIG. 7 is a side cross-sectional view, on an enlarged scale, of the device of FIG. 5, the float being shown in intermediate position for purposes of illustration.

The embodiment of FIGS. 1–4 is of an absolute vacuum gage specifically designed for measuring and indicating vacuums between zero and ten mm. of mercury, and was developed for use in measuring that intermediate vacuum range where absolute manometers do not give sufficiently precise readings and where McLeod gages provide excess sensitivity. The housing, generally designated 2, is formed of a tube 4 of transparent glass the upper end 6 of which is narrowed so that connection may be made to the system to be measured. The lower end 8 thereof is open, at 10, and is provided with an outwardly extending flange 12. An appropriate scale 14, graduated in millimeters of mercury, is provided on a wall of the tube 4.

The float, generally designated 16, may be formed of a thin-walled glass tube 18 here shown open at its lower end 20 and closed at its upper end 22 (although either or both of the ends 20 and 22 of the tube 18 could be open). An index mark 58 is inscribed thereon. A cap 24, which may be formed of a molded plastic material such as polyethylene, is fitted over the upper end 22 of the tube 18, closing that end if it is open, the cap 24 being provided with a plurality of radially outwardly extending fingers 26 adapted to slidably engage the inner surface of the tube 4 and thus support the float 16 laterally while permitting free vertical sliding movement thereof. A cap 28, which also is conveniently formed of molded plastic such as polyethylene, is received on the lower end 20 of the tube 18. This cap is provided with radially outwardly extending fingers 30 similar to the fingers 26 on the cap 24. It is further provided with a bottom wall 32 from which a central tube 34 depends, the wall 32 closing the open lower end 20 of the tube 18 except for the opening defined by the tube 34, that opening having a cross sectional area which is a minor fraction of the cross sectional area of the tube 18. For example, if the inner diameter of the tube 18 is approximately 10 mm., the diameter of the opening defined by the tube 34 may be 1/16 inch.

A piston 36 is slidably received within the lower end 8 of the tube 4, and is provided with a peripheral groove 38 in which a sealing ring 40 is received, that ring sealing engaging the inner surface of the tube 4. A threaded shank 42 extends from the piston 36 out beyond the tube 4, and an adjusting knob 44 is secured thereto, as by means of the set screw 46. An internally threaded nut 48 has an inwardly extending flange 50 which seats on the flange 12 of the tube 4, and an adapter 52 is threaded into the nut 48 so as to draw flanges 50 and 12 into firm engagement. The interior of the adapter 52 is internally threaded at 54, and the shank 42 is threadedly engaged therewith.

The float-supporting liquid 56, usually mercury, is received inside the tube 4 at the lower section thereof and is supported by the piston 36, that piston 36 defining a wall part for the chamber within which the float 16 and liquid 56 are received, the position of that wall part relative to the remainder of the housing 2 being adjustable through rotation of the shank 42 within the adapter 52.

When the device of FIGS. 1–4 is to be used an appropriate amount of mercury or other suitable liquid 56 is introduced into the tube 4 through its upper end 6, the piston 36 preferably being at an intermediate position as shown in FIG. 3. The mercury level should be about fifteen mm. below the bottom of the scale 14 when the piston 36 is in such intermediate position. The upper tube end 6 is attached to a source of high vacuum and the instrument is evacuated while held in a horizontal position. This permits some mercury to enter the float 16 through the opening 34. The instrument is then turned to a vertical position and air is introduced into the instrument until atmospheric pressure has been reached. In order to set the instrument to its proper zero reading, a source of high vacuum is connected to the upper tube end 6 while the instrument is vertical and the instrument is evacuated. On the assumption that this high vacuum represents zero millimeters of mercury, the vertical position of the piston 36 is adjusted, by rotating the knob 44, until the position of the index mark 58 on the float 16 is brought opposite the zero mark on the scale 14. Movement of the piston 36 up or down will cause the body of liquid 56 to move correspondingly, and the float 16 supported in that body of liquid 56 will likewise move correspondingly. Thus the instrument is readily calibrated for a zero setting merely through rotation of the knob 44. The combination of the index mark 58 and the scale 14 constitute means for producing an output function, in this instance an indication of the measured pressure.

The pressure applied to the upper portion of the chamber in which the float 16 is received will, of course, be communicated to the interior of the tube 18 via the opening defined by the tube 34, as is necessary if the device is to function properly. If there is a rapid fall in the pressure the change in pressure will be communicated to the interior of the float 16, causing that float to drop, but the narrowness of the opening defined by the tube 34 will exert a throttling effect, delaying the application of that reduced pressure to the interior of the float 16, so that the float 16 will drop at a less rapid rate than the pressure falls. Thus the impact of the tube 18 on the bottom wall of the chamber, defined by the piston 36, will be minimized, and the tendency of the thin tube 18 of which the float 16 is formed to break will be minimized. In addition, the existence of the cap 28 covering the lower end of the tube 18, and particularly the depending tubular portion 34 thereof, will act as a shock absorber, further increasing the safety factor. The use of plastic caps 24 and 28 facilitates manufacture of the device and reduces its cost, by permitting the use of standard thin-walled glass tubing for the float 16, in addition to improving its resistance to breakage. Similarly, the formation of the movable wall part which provides for zero adjustment in the form of a piston 36 which sealingly engages the inside of the tube 2 by means of the sealing ring 40 permits the use of standard glass tubing for the housing 2, and at the same time provides for a reliable seal which effectively prevents escape of any of the liquid 56.

Moreover, the construction is such that the device may readily be disassembled for cleaning or replacement of parts, this being accomplished merely by disassembling the nut 48 from the adapter 52 and then sliding the piston 36 out through the open end 8 of the tube 4.

The embodiment of FIGS. 5–7 discloses the instant invention as adapted for functioning as a manostat to control the vacuum applied to a system and to maintain that vacuum at a desired value. Many of the parts of the embodiment of FIGS. 5–7 are similar to those of the gage embodiment of FIGS. 1–4, and similar reference numerals will be applied thereto, differentiated, however, by being primed.

The housing 2' is similar to the housing 2 of the gage embodiment, except that two outlet openings 6a and 6b are provided at the upper end of the tube 4', the opening 6b communicating with a nozzle 60 extending downwardly into the upper section of the tube 4' and terminating in a valve opening 62. While the float 16' could be constructed substantially as in the embodiment of FIGS. 1–4, it is here specifically disclosed in a different form (which, if desired, could be used in the gage embodiment). As disclosed it comprises a thin-walled body 18' having an internal diameter only slightly less than that of the tube 4' and provided with integrally formed radially outward projections 26' which slidably engage the inner surface of the tube 4'. The lower end of the body 18' is constricted to define an opening 34' which has a cross-sectional area which is but a minor fraction of the cross-sectional area of the interior of the tube 18'. The body 18' has a substantially solid upper end 22' on which a soft rubber or plastic cap 24' is mounted, that cap 24' being in line with the opening 62 at the tip of the nozzle 60.

A device of this type is designed to have the opening 6a connected to the system being controlled and the opening 6b connected to the vacuum source. As the system to be controlled is evacuated the pressure in the upper section of the chamber defined by the tube 4' is reduced and the float 16' rises. When the vacuum reaches a predetermined value the float 16' will rise sufficiently to bring its cap 24' into engagement with the tip of the nozzle, closing the opening 62 and cutting off the vacuum source from the system being controlled. When the pressure in the system being controlled rises the float 16' will fall, the opening 62 at the tip of the nozzle 60 will once again be exposed, and the vacuum source will cause the pressure within the system being controlled to again be reduced to a desired value. As is known, a small bleed in the system will improve sensitivity of control by keeping the float in a dynamic condition.

The particular pressure value at which this vacuum control is effected is determined preliminarily by the amount of gas trapped in the float 18'. Micrometric adjustment thereof is achieved through appropriate vertical movement of the piston 36' by rotation of the knob 44'. Upward movement of the piston 36' will cause the float 116' to assume a higher position for a given degree of vacuum, and thus will cause the manostat to disconnect the system under control from the suction source at a lower degree of vacuum (higher pressure), while movement of the piston 36' downwardly will cause the float 16' to assume a lower position for a given degree of vacuum, thus effecting vacuum control of the system at a lower pressure (higher vacuum). It is significant that the control point set by positioning the piston 36' is permanent, unless the piston 36' is repositioned, and will remain effective even after release of vacuum. The combination of the cap 24' constituting a valve means and the outlet opening 62 define means for producing an output function, in this case control of the pressure within the system.

While but a limited number of embodiments of the present invention have been here specifically disclosed, it will be apparent that many variations may be made therein, all without departing from the spirit of the invention as defined in the following claims.

I claim:
1. A cartesian diver type pressure sensitive instrument comprising a substantially straight piece of elongated glass tubing having walls defining a chamber adapted to contain a supply of liquid in a portion thereof, said tubing having an opening at one end of the same size as the interior of said tubing and having an outlet adjacent its other end communicating with said chamber, a vertically elongated float in said chamber, said float having an inner chamber open only at the bottom of said float, said float being adapted to float inside said liquid with a portion thereof above the level of said liquid and said liquid being adapted to enter said float chamber via the opening at the bottom of said float, a piston received inside said tubing through said opening at said one end thereof, sealing means carried by said piston, interposed between said piston and the inner surrface of said tubing and effective to produce a vacuum-tight sliding seal therebetween, said piston defining the bottom wall of said chamber in said tubing and being movable along the inside of said tubing in the direction of the length of said tubing so as to vary the volume of said chamber, and means operatively connected between said tubing and said piston and accessible from the exterior of said tubing effective to position said piston along said tubing, and output function means responsive to the position of said float relative to said tubing.

2. The instrument of claim 1, in which said tubing is provided with a transparent portion through which said float is visible when said float is floating in said liquid, one of said float and said housing portion being provided with an index mark and the other of said float and said housing being provided with a graduated scale extending in the direction of the length of said tubing, said index mark and said scale cooperating with one another, whereby the position of said piston relative to said tubing determines the calibration of said scale members relative to the pressure being sensed, said index mark-scale combination defining said output function means.

3. In the instrument of claim 1, said chamber having a second outlet opening adjacent said other end thereof which communicates with said chamber, and valve means including a part carried by said float operatively engageable with one of said outlet openings to seal off said one of said outlet openings when said float has risen in said chamber to a predetermined position, the position of said piston lengthwise of said tubing determining the pressure at which such engagement takes place, said valve means-outlet opening combination defining said output function means.

References Cited by the Examiner

UNITED STATES PATENTS

| | | | |
|---|---|---|---|
| 1,675,522 | 7/1928 | Weidinger et al. | 272—8 |
| 1,928,096 | 9/1933 | Dubrovin | 73—403 |
| 2,123,978 | 7/1938 | Wagner | 73—403 X |
| 2,352,302 | 6/1944 | Young | 73—403 |
| 2,482,167 | 9/1949 | Gilmont | 137—599.2 |
| 2,525,232 | 10/1950 | McGaughy | 272—8 |
| 2,702,047 | 2/1955 | Gilmont | 137—495 |
| 3,035,600 | 5/1962 | Gilmont | 137—247 |

OTHER REFERENCES

Publication: Bulletin VG "New Open End McLeod Gauge," Manostat Corp. of New York, 2 pages, copyright 1959.

LOUIS R. PRINCE, *Primary Examiner.*

DONALD O. WOODIEL, *Assistant Examiner.*